(12) United States Patent
Ogawa et al.

(10) Patent No.: US 12,139,563 B2
(45) Date of Patent: Nov. 12, 2024

(54) ISOPRENE-BASED POLYMER LATEX COMPOSITION

(71) Applicant: SHOWA DENKO K.K., Tokyo (JP)

(72) Inventors: Masahiro Ogawa, Tokyo (JP); Tomoaki Murata, Tokyo (JP); Noriko Ogawa, Tokyo (JP); Masanao Kamijo, Tokyo (JP)

(73) Assignee: Resonac Corporation, Tokyo (JP)

( * ) Notice: Subject to any disclaimer, the term of this patent is extended or adjusted under 35 U.S.C. 154(b) by 662 days.

(21) Appl. No.: 17/421,149

(22) PCT Filed: Nov. 26, 2019

(86) PCT No.: PCT/JP2019/046125
§ 371 (c)(1),
(2) Date: Jul. 7, 2021

(87) PCT Pub. No.: WO2020/144955
PCT Pub. Date: Jul. 16, 2020

(65) Prior Publication Data
US 2022/0073657 A1 Mar. 10, 2022

(30) Foreign Application Priority Data

Jan. 10, 2019 (JP) ................. 2019-002653

(51) Int. Cl.
| | | |
|---|---|---|
| C08F 136/08 | (2006.01) | |
| B29C 41/00 | (2006.01) | |
| C08K 3/22 | (2006.01) | |
| C08K 5/00 | (2006.01) | |
| C08L 11/02 | (2006.01) | |
| C08L 93/04 | (2006.01) | |
| B29L 31/48 | (2006.01) | |

(52) U.S. Cl.
CPC .......... *C08F 136/08* (2013.01); *B29C 41/003* (2013.01); *C08K 3/22* (2013.01); *C08K 5/0025* (2013.01); *C08K 5/005* (2013.01); *C08L 11/02* (2013.01); *C08L 93/04* (2013.01); *B29L 2031/4864* (2013.01); *C08K 2003/2296* (2013.01); *C08L 2201/52* (2013.01); *C08L 2205/18* (2013.01)

(58) Field of Classification Search
CPC . C08F 136/08; C08K 3/22; C08K 2003/2296; C08K 5/0025; C08K 5/005; C08L 11/02; C08L 93/04; C08L 2201/52; C08L 2205/18; C08L 9/10; B29L 2031/4864
See application file for complete search history.

(56) References Cited

U.S. PATENT DOCUMENTS

| | | | |
|---|---|---|---|
| 9,394,454 B2 | 7/2016 | Hashimoto et al. | |
| 10,253,170 B2 | 4/2019 | Lucas et al. | |
| 2012/0238678 A1 | 9/2012 | Minorikawa et al. | |
| 2014/0011936 A1 | 1/2014 | Hashimoto et al. | |
| 2015/0087761 A1* | 3/2015 | Satoh | C08J 5/02 526/335 |
| 2015/0272241 A1 | 10/2015 | Lucas et al. | |
| 2018/0112055 A1* | 4/2018 | Ogawa | C08L 11/02 |
| 2019/0218375 A1 | 7/2019 | Lucas et al. | |

FOREIGN PATENT DOCUMENTS

| | | | |
|---|---|---|---|
| JP | 2004-210993 A | 7/2004 | |
| JP | 2017-508840 A | 3/2017 | |
| WO | 2011/065524 A1 | 6/2011 | |
| WO | 2012/137663 A1 | 10/2012 | |
| WO | 2015/143473 A1 | 10/2015 | |
| WO | WO-2016166998 A1 * | 10/2016 | ......... A41D 19/0055 |

* cited by examiner

*Primary Examiner* — Ling Siu Choi
*Assistant Examiner* — Olga Lucia Donahue
(74) *Attorney, Agent, or Firm* — Sughrue Mion, PLLC

(57) ABSTRACT

An isoprene-based polymer latex composition includes a chloroprene polymer latex (A) and an isoprene polymer latex (B), in which the chloroprene polymer has a z-average particle size of 180 nm or greater and smaller than 300 nm, and a tetrahydrofuran-insoluble fraction of 80 to 99% by mass; the chloroprene polymer latex (A) is (1) a copolymer latex of chloroprene (A 1) and 2,3-dichloro-1,3-butadiene (A-2-1), or (2) a copolymer latex of the above (A-1) and (A-2 1), and another monomer (A-2-2); and the copolymer is obtained by copolymerization in which the ratio of 2,3-dichloro-1,3-butadiene (A-2-1) is 5.0 to 30.0% by mass relative to the total amount of the monomer components chloroprene (A-1) and 2,3-dichloro-1,3-butadiene (A-2-1) of 100% by mass. The isoprene-based polymer latex composition's quality is maintained, and the properties after cross-linking of a molded product obtained by dipping a dipping former into the composition multiple times do not deteriorate.

18 Claims, No Drawings

ISOPRENE-BASED POLYMER LATEX COMPOSITION

CROSS REFERENCE TO RELATED APPLICATIONS

This application is a National Stage of International Application No. PCT/JP2019/046125 filed Nov. 26, 2019, claiming priority based on Japanese Patent Application No. 2019-002653 filed Jan. 10, 2019.

TECHNICAL FIELD

The present invention relates to an isoprene-based polymer latex composition comprising a chloroprene polymer latex and an isoprene polymer latex. The isoprene-based polymer latex composition according to the present invention maintains the ratio of both polymer latexes therein contained even after the repeated dipping of a former during the production process of molded products by a dip-molding method, and enables molded products obtained in the multiple-time dipping to have physical properties with no deterioration between those molded products, for example, medical gloves and other products to have post cross-linked physical properties with no deterioration between those products.

BACKGROUND ART

A chloroprene polymer is a crystalline high-molecular rubber that contains chlorine. Among various types of rubbers, chloroprene polymers have a good balance of physical properties such as chemical resistance, heat resistance, and weatherability, and are used for a broad range of applications such as glove products.

However, chloroprene polymers generally require high temperature conditions at 120 to 130° C. for cross-linking, and exhibit poor energy efficiency during cross-linking compared with rubbers such as natural rubber and isoprene polymers which are cross-linked at a temperature of 100 to 110° C. Chloroprene polymers cross-linked at a temperature of 100 to 110° C. contain many parts remaining uncross-linked, causing serious deterioration in breaking strength. For this reason, their improved productivity and cross-linking physical properties have been required for the production of products such as gloves by a dip-molding method.

A method is known in which natural rubber, or a synthetic rubber such as an isoprene rubber being cross-linkable at a temperature of 100 to 110° C., is mixed with a chloroprene polymer to improve the various mechanical properties thereof.

However, there is a problem such that multiple-time dipping in a composition obtained by mixing a chloroprene polymer with another rubber causes a change in the ratio of rubber components contained in the mixed composition due to the film forming rates varying in accordance with the types of rubber, resulting in unstable mechanical properties of obtained molded products.

For example, JP 2017-508840 A (Patent Literature 1) discloses that a glove product having a breaking strength of 18 to 25 MPa is obtained by using a composition comprising 40 to 60% by mass of an isoprene rubber relative to 40 to 60% by mass of a chloroprene rubber, and being free of diphenyl guanidine. Patent Literature 1 describes only the mechanical properties of cross-linked molded products obtained by a single dipping operation, not referring to whether cross-linked molded products obtained by multiple-time dipping operations also exhibit equivalent mechanical properties.

CITATION LIST

Patent Literature

Patent Literature 1: JP 2017-508840 A (U.S. Ser. No. 10/253,170 B2)

SUMMARY OF INVENTION

Technical Problem

In view of the above problems, the object of the present invention is to provide a composition comprising a chloroprene polymer latex and an isoprene polymer latex (hereinafter referred to as an isoprene-based polymer latex composition in the present description) that maintains the quality thereof during a dipping step, and prevents the deterioration in the cross-linking physical properties of molded products obtained by the dipping of a dipping former multiple times in the above composition.

Solution to Problem

As a result of earnest studies to achieve the above object, the present inventors have focused on the different film forming rates of a chloroprene polymer latex and an isoprene polymer latex, and found that the quality of obtained rubber molded products does not deteriorate even after multiple-time dipping operations, when the z-average particle size of a chloroprene polymer is adjusted within a specific range, thereby completing the present invention.

Namely, the present invention relates to an isoprene-based polymer latex composition and dip-molded products as described below.

1

An isoprene-based polymer latex composition comprising a chloroprene polymer latex (A), an isoprene polymer latex (B), and an emulsifier (C), wherein the chloroprene polymer latex has a z-average particle size of chloroprene polymer particles contained therein of 180 nm or greater and smaller than 300 nm and a tetrahydrofuran insoluble fraction of 80 to 99% by mass, the chloroprene polymer latex (A) is (1) a copolymer latex of chloroprene (A-1) and 2,3-dichloro-1,3-butadiene (A-2-1), or (2) a copolymer latex of chloroprene (A-1), 2,3-dichloro-1,3-butadiene (A-2-1), and another monomer (A-2-2), and the copolymer is obtained by copolymerization in which the ratio of 2,3-dichloro-1,3-butadiene (A-2-1) is 5.0 to 30.0% by mass relative to the total amount of the monomer components chloroprene (A-1) and 2,3-dichloro-1,3-butadiene (A-2-1) of 100 by mass.

2

The isoprene-based polymer latex composition described in (1), comprising at least one of a metal oxide (D), a cross-linking accelerator (E), and an antioxidant (F).

3

The isoprene-based polymer latex composition described in [1], wherein the emulsifier (C) is an anionic surfactant.

4

The isoprene-based polymer latex composition described in [1], wherein the emulsifier (C) contains a rosin acid soap obtained by saponifying a rosin acid with sodium hydroxide and/or potassium hydroxide in an excess amount relative to the rosin acid.

5

The isoprene-based polymer latex composition described in any one [2] to [4], comprising, relative to 100 parts by mass of solid content contained in the isoprene-based polymer latex composition, the emulsifier (C) in a ratio of 1.0 to 30.0 parts by mass, the metal oxide (D) in a ratio of 0.1 to 20.0 parts by mass, the cross-linking accelerator (E) in a ratio of 0.1 to 10.0 parts by mass, and the antioxidant (F) in a ratio of 0.1 to 10.0 parts by mass.

6

The isoprene-based polymer latex composition described in any one of [1] to [5], wherein the mass ratio of the solid content contained in the chloroprene polymer latex (A) to the solid content contained in the isoprene polymer latex (B) is 50:50 to 1:99.

7

The isoprene-based polymer latex composition described in any one of [1] to [6], wherein the film forming rate of the chloroprene polymer latex is 0.15 mm/min or higher and 0.50 mm/min or lower.

8

The isoprene-based polymer latex composition described in any one of [1] to [7], wherein the film forming rate of the chloroprene polymer latex is 41% or higher relative to the film forming rate of the isoprene polymer latex to be mixed.

9

The isoprene-based polymer latex composition described in any one of [1] to [8], wherein the chloroprene polymer latex has a pH value of 10.5 or higher and 14.0 or lower.

10

The isoprene-based polymer latex composition described in any one of [1] to [9], wherein the isoprene polymer particles in the isoprene polymer latex have a z-average particle size of 300 nm or greater and 1,000 nm or smaller.

11

A dip-molded product obtained by curing the isoprene-based polymer latex composition described in any one of [1] to [10] by a dip-molding method.

12

The dip-molded product described in [11], which is a disposable rubber glove.

Advantageous Effects of Invention

The isoprene-based polymer latex composition according to the present invention maintains the quality of the composition even after the repeated dipping of a former by a dip-molding method, and also maintains the cross-linking properties of the molded product which is a dip-molded product, resulting in the obtainment of a molded product having stable performance.

DESCRIPTION OF EMBODIMENTS

Embodiments of the present invention are described in detail below.

The isoprene-based polymer latex composition according to the present invention comprises a chloroprene polymer latex (A), an isoprene polymer latex (B), and an emulsifier (C), and a chloroprene polymer contained in the chloroprene polymer latex has a 2-average particle size of 180 nm or greater and smaller than 300 nm.

The isoprene-based polymer latex composition according to the present invention may comprise at least one of a metal oxide (D), a cross-linking accelerator (E), and an antioxidant (F).

An embodiment of components of the isoprene-based polymer latex composition according to the present invention and the z-average particle size of the chloroprene polymer are described in detail below.

The isoprene-based polymer latex composition according to the present invention comprises, as polymer latex components, a chloroprene polymer latex which has a specific structure and an isoprene polymer latex.

Chloroprene Polymer Latex (A):

In the present description, a chloroprene polymer latex (A) having a specific structure means (1) a copolymer latex of chloroprene (A-1) and 2,3-dichloro-1,3-butadiene (A-2-1), or (2) a copolymer latex of chloroprene (A-1), 2,3-dichloro-1,3-butadiene (A-2-1), and another monomer (A-2-2).

Relative to the total amount of 2-chloro-1,3-butadiene (chloroprene) (A-1) and 2,3-dichloro-1,3-butadiene (A-2-1) of 100 parts by mass, the ratio of 2,3-dichloro-1,3-butadiene (A-2-1) as a monomer component of the copolymer is 5.0 to 30.0 parts by mass, preferably 7.0 to 24.0 parts by mass, and more preferably 8.5 to 15.0 parts by mass. When the ratio of (A-2-1) is 5.0 parts by mass or higher, the temporal stability of flexibility is well improved, and when the ratio is 30.0 parts by mass or lower, polymer crystallization is suppressed and good flexibility is obtained.

Examples of another copolymerizable monomer component (A-2-2) are 1-chloro-1,3-butadiene, butadiene, isoprene, styrene, acrylonitrile, acrylic acid and the esters thereof, and methacrylic acid and the esters thereof. The ratio is, relative to 100 parts by mass of 2-chloro-1,3-butadiene (chloroprene) (A-1), preferably 0.1 to 20.0 parts by mass, more preferably 0.5 to 15.0 parts by mass, and still more preferably 1.0 to 10.0 parts by mass. Depending on necessity, 2 or more of the monomer components may be used. By determining the ratio of (A-2-2) relative to 100 parts by mass of (A-1) to be 20.0 parts by mass or lower, the temporal stability of flexibility, in addition to tensile strength and elongation, of dip-molded products can be well maintained.

Method for Polymerizing Chloroprene Polymer Latex (A):

As a method for polymerizing a chloroprene polymer latex (A), emulsion polymerization may be adopted, and aqueous emulsion polymerization is particularly preferred from industrial viewpoints.

Emulsifier (C) Used in Polymerization of Chloroprene Polymer Latex (A):

As the emulsifier (C), an anionic surfactant is preferred. Examples of anionic surfactants are an alkali metal salt of a disproportionated rosin acid, dodecylbenzenesulfonates (such as a sodium salt of dodecylbenzenesulfonic acid, and a triethanolamine salt of dodecylbenzenesulfonic acid), diphenylethersulfonates (such as a sodium salt of diphenylethersulfonic acid, and an ammonium salt of diphenylethersulfonic acid), naphthalenesulfonates (such as a sodium salt of a β-naphthalenesulfonic acid formaldehyde condensate), fatty acid alkali metal salts (such as potassium laurate), and polyoxyalkylene alkyl ether sulfonates (such as sodium polyoxyethylene alkyl ether sulfonate). Among the anionic surfactants above, an ordinary rosin acid soap is preferably used in terms of simple and convenient solidification operations. From the viewpoint of coloring stability, a sodium or a potassium salt of a disproportionated rosin acid is particularly preferred.

The use amount of the emulsifier (C) is, relative to 100 parts by mass of solid content contained in the isoprene-based polymer latex, preferably 1.0 to 30.0 parts by mass, more preferably 2.0 to 20.0 parts by mass, and still more preferably 3.0 to 10.0 parts by mass. When the use amount is 1.0 part by mass or higher, stable emulsification is performable, and heat generation during polymerization is well controlled, aggregate formation is suppressed, and good product appearance is obtained, for example. Mechanical stability is also improved and aggregate formation is suppressible at the time of mixing with a chloroprene polymer.

When the use amount is 30.0 parts by mass or lower, a low adhesive polymer containing a lesser amount of an emulsifier remaining therein is obtained, and a mold (former) is easily detached during the molding of a component, resulting in good workability and operability. Good color tones of products are also obtained.

Emulsifiers may be used in combination of 2 or more thereof.

Polymerization Initiator Used for Polymerizing Chloroprene Polymer Latex (A):

Generic radical polymerization initiators, which are not particularly limited, may be used. Preferred examples of polymerization initiators used in emulsion polymerization are specifically organic or inorganic peroxides such as benzoyl peroxide, potassium persulfate, and ammonium persulfate; and azo compounds such as azobisisobutyronitrile. Promoters such as anthraquinone sulfonate, potassium sulfite, and sodium sulfite may be used simultaneously, if appropriate. The radical polymerization initiators and promoters as such may be used in combination of 2 or more thereof.

Polymerization Terminator Used in Polymerizing Chloroprene Polymer Latex (A):

For terminating the polymerization of the chloroprene polymer latex (A), generic terminators, which are not particularly limited, may be used. Preferred examples are specifically phenothiazine, para-t-butylcatechol, hydroquinone, hydroquinone monomethyl ether, and diethylhydroxylamine. The polymerization terminators as such may be used in combination of 2 or more thereof.

Polymerization Conversion of Chloroprene Polymer Latex (A):

The polymerization conversion of the chloroprene polymer latex (A) is preferably 65% or higher, more preferably 70% or higher, and still more preferably 74% or higher. At a polymerization conversion of 65's or higher, there is a sufficient amount of tetrahydrofuran insoluble component in the solid content, resulting in good physical properties of a cross-linked film during molding using a chloroprene polymer alone and during molding using a mixture of a chloroprene polymer and an isoprene polymer.

Z-Average Particle Size of Chloroprene Polymer Particles:

According to the present invention, the z-average particle size of a chloroprene polymer which is a main polymer component of the isoprene-based polymer latex composition is adjusted within a specific range (of 180 nm or greater and smaller than 300 nm). Thereby the quality of the isoprene-based polymer latex composition which is used in a repeated dipping step is maintained, and the isoprene-based polymer latex composition suppressing the deterioration in the cross-linking physical properties of molded products that are obtained by the multiple-time dipping of a dipping former in the composition is obtainable.

In the present description, the z-average particle size of chloroprene polymer particles contained in the chloroprene polymer latex (A) is obtained by measuring a solution of the latex diluted with pure water to 0.1% by mass with a dynamic light scattering photometer (ZETASIZER® Nano-S, produced by Malvern Panalytical Ltd). An anionic chloroprene polymer latex using a rosin acid soap as an emulsifier ordinarily has a z-average particle size of 148 to 320 nm. According to the present invention, the z-average particle size of a chloroprene polymer is controlled to 180 nm or greater and smaller than 300 nm, preferably 190 nm or greater and smaller than 280 nm, and more preferably 200 nm or greater and smaller than 260 nm by adjusting the amount of a rosin acid and the amounts of emulsifiers relative to the parts by mass of monomers.

In order to achieve the z-average particle size targeted by the present invention, it is desirable to add a rosin acid which is a raw material of a rosin acid soap in an amount of 1.8 to 3.4 parts by mass relative to 100 parts by mass of the total amount of monomers constituting the chloroprene polymer latex (A).

When the z-average particle size is 180 nm or greater, dehydrochlorination from the chloroprene polymer latex (A) is suppressed and stability of the chloroprene polymer latex (A) is obtained, resulting in suppressed aggregate formation. When the z-average particle size is 300 nm or smaller, a rosin acid soap in an amount sufficient for preferred emulsification is obtained and thus heat generation during polymerization is well controlled, aggregate formation is suppressed, and good product appearance is obtained.

An example of a method for adjusting a z-average particle size of a polymer contained in the chloroprene polymer latex (A) is a method of adjusting the amount of an emulsifier at the start of polymerization. In general, when using the same emulsifier, the lower the emulsifier concentration at the start of polymerization is, the greater the z-average particle size is. For example, when the amount of a rosin acid contained in a rosin acid soap is determined to be 3.4 parts by mass relative to 100 parts by mass of monomers, and a polymerization conversion is determined to be 90 or higher, the z-average particle size is 150 nm. In contrast, when the amount of a rosin acid is determined to be 2.5 parts by mass and a polymerization conversion is determined to be 90% similarly, the z-average particle size is 200 nm. Methods for particle size adjustment are not limited to the above exemplified one. The z-average particle size may also be adjusted by methods different from the above exemplified one, for example by a method of changing the types of emulsifiers or by a method of further adding a monomer.

Tetrahydrofuran Insoluble Fraction of Chloroprene Polymer Latex (A):

The tetrahydrofuran insoluble fraction of the chloroprene polymer latex (A) is preferably 80 to 99% by mass, and more preferably 88 to 95% by mass. The tetrahydrofuran insoluble fraction of lower than 80% by mass is not preferred since detachment from a former during molding is difficult due to decreased cross-linking rates and deteriorated breaking strength. The breaking strength of molded products produced from a mixture with an isoprene polymer is deteriorated as well. When the tetrahydrofuran insoluble fraction is higher than 99% by mass, the polymer becomes brittle with reduced flexibility and deteriorated breaking strength and tensile elongation.

The tetrahydrofuran insoluble fraction is evaluated by the method below.

A chloroprene polymer latex in an amount of 1 g is added dropwise to 100 mL of tetrahydrofuran, and is shaken for 24 hours. The obtained mixture is thereafter subjected to centrifugal separation with a centrifuge (high-speed cooling centrifuge H-9R, produced by Kokusan Co., Ltd.) at 14,000 rpm for 60 minutes, and a supernatant dissolved phase is obtained. The dissolved phase is evaporated/dried and solidified at a temperature of 100° C. for 1 hour, and the mass of the obtained dry solid matter is measured.

Tetrahydrofuran insoluble fraction (%)=(1−[(tetrahydrofuran dissolved amount)/(amount of solid content in 1 g of chloroprene copolymer latex)]×100

Solid content is measured by the method described in Examples.

The pH value of the chloroprene polymer latex at a temperature of 25° C. is preferably 10.5 or higher and 14.0 or lower, more preferably 11.5 or higher and 13.9 or lower, and still more preferably 12.5 or higher and 13.8 or lower. Chloroprene polymer latexes having a pH value within the above range are preferred since an anionic surfactant which is an emulsifier is stable and aggregate formation is suppressible.

The Brookfield viscosity of the chloroprene polymer latex is preferably 5.0 mPa·s or higher and 90.0 mPa·s or lower, more preferably 6.0 mPa·s or higher and 60.0 mPa·s or lower, and still more preferably 9.0 mPa·s or higher and 40.0 mPa·s or lower. Chloroprene polymer latexes having a Brookfield viscosity of 90.0 mPa·s or lower are preferred in terms of easy handling due to appropriate viscosity. Chloroprene polymer latexes having a Brookfield viscosity of 5.0 mPa·s or higher are also preferred due to mixed additives (such as a cross-linking agent, a cross-linking accelerator, and a preservative) diffusing in the latexes at high rates and shortened maturation time.

The weight average molecular weight Mw of the chloroprene polymer is preferably 300,000 to 3,000,000, more preferably 500,000 to 2,500,000, and still more preferably 700,000 to 2,000,000. Chloroprene polymers having a weight average molecular weight Mw of 300,000 or higher are preferred since good breaking strength is obtained by cross-linking. Chloroprene polymers having a weight average molecular weight Mw of 2,000,000 or lower are also preferred since suitable hardness is obtained due to a cross-linked film with suppressed hardening.

Isoprene Polymer Latex (B):

Isoprene polymers constituting the isoprene polymer latex (B) used in the present invention are not particularly limited and may be a homopolymer of an isoprene monomer alone or copolymers of an isoprene monomer as a main monomer component and another monomer copolymerizable with isoprene.

Examples of another monomer copolymerizable with isoprene are 1,3-butadiene, styrene, chloroprene, methacrylic acid, methyl methacrylate, acrylic acid, methyl acrylate, acrylonitrile, acrylamide, vinyl chloride, vinyl acetate, N-vinylpyrrolidone, vinylidene chloride, and vinylidene fluoride.

The weight average molecular weight Mw of the isoprene polymer is preferably 500,000 to 5,000,000, more preferably 550,000 to 4,500,000, and still more preferably 600,000 to 4,000,000. Isoprene polymers having a weight average molecular weight Mw of 500,000 or higher are preferred since good breaking strength is obtained by cross-linking. Isoprene polymers having a weight average molecular weight Mw of 5,000,000 or lower are also preferred since the hardening of a cross-linked film is suppressed and suitable hardness is obtained.

The tetrahydrofuran insoluble fraction of the isoprene polymer latex is 0% by mass to 30% by mass, preferably 0% by mass to 25% by mass, and more preferably 0% by mass to 20% by mass. The isoprene polymer latexes having a tetrahydrofuran insoluble fraction within the above range are preferred since the number of sites reacted with a cross-linking agent is appropriate, good cross-linking rates are obtained, and mechanical properties after cross-linking are excellent.

The pH value of the isoprene polymer latex at a temperature of 25° C. is preferably 9.0 to 13.0, more preferably 9.5 to 12.5, and still more preferably 10.0 to 12.0. The isoprene polymer latexes having pH values within the above range are preferred since an anionic surfactant which is an emulsifier is stable and aggregate formation is suppressible.

The Brookfield viscosity of the isoprene polymer latex is preferably 20 mPa·s to 100 mPa·s, more preferably 25 mPa·s to 95 mPa·s, and still more preferably 25 mPa·s to 90 mPa·s. Isoprene polymer latexes having a Brookfield viscosity of 100 mPa·s or lower are preferred in terms of easy handling due to appropriate viscosity. Isoprene polymer latexes having a Brookfield viscosity of 20 mPa·s or higher are also preferred due to mixed additives (such as a cross-linking agent, a cross-linking accelerator, and a preservative) diffusing in the latexes at high rates and shortened maturation time.

For the isoprene-based polymer latex composition according to the present invention, at least one or preferably three additives selected from a metal oxide (D), a cross-linking accelerator (E), and an antioxidant (F) are preferably added to the chloroprene polymer latex and the isoprene polymer latex before mixing both latexes. By adding the above, an isoprene-based polymer latex composition enabling the formation of dip-molded products having sufficient tensile strength and flexibility is obtained. Among components to be added, water-insoluble components or components destabilizing the colloid state of the latex are made into aqueous dispersions beforehand, which are then added to each of the copolymer latexes.

Metal Oxide (D):

Since chloroprene polymers are generally prone to deterioration caused by oxygen, a metal oxide is preferably added for the purpose of acid acceptance or oxidation prevention. The metal oxide is not particularly limited and specific examples are zinc oxide, lead dioxide, and trilead tetraoxide. The above may be used in combination of 2 or more. By the use with cross-linking accelerators below, cross-linking is more effectively performable. The addition amount of those metal oxides is preferably 0.1 to 20.0 parts by mass, more preferably 0.5 to 15.0 parts by mass, and still more preferably 1.0 to 10.0 parts by mass, relative to 100 parts by mass of solid content contained in each of the polymer latexes. By adding a metal oxide in an amount of 0.1 parts by mass or higher, a sufficient cross-linking rate is obtained. By adding a metal oxide in an amount of 20.0 parts by mass or lower, good cross-linking is achieved and scorching is suppressed. In addition, the polymer latex composition exhibits improved colloid stability, barely causing problems such as sedimentation.

In the isoprene-based polymer latex composition according to the present invention, a generic cross-linking agent, which is not particularly limited, may be used. Cross-linking agents such as sulfur, a sulfur compound, and an organic peroxide may be used. These may be used in combination of 2 or more thereof.

Cross-Linking Accelerator (E):

According to the present invention, a cross-linking accelerator is preferably used. Usable cross-linking accelerators are ones which are generally used in cross-linking isoprene-based polymer latexes and are based on thiuram, dithiocarbamate, thiourea, or guanidine, and thiuram-based ones are preferred. Examples of thiuram-based cross-linking accelerators are tetraethylthiuram disulfide, and tetrabutylthiuram disulfide. Examples of dithiocarbamate-based cross-linking accelerators are sodium dibutyldithiocarbamate, zinc dibutyldithiocarbamate, and zinc diethyldithiocarbamate. Examples of thiourea-based cross-linking accelerators are ethylenethiourea, diethylthiourea, trimethylthiourea, and N,N'-diphenylthiourea, and N,N'-diphenylthiourea is particularly preferred. Examples of guanidine-based cross-linking accelerators are diphenyl guanidine, and di-o-tolylguanidine. The above cross-linking accelerators may be used in combination of 2 or more thereof. The addition amount of those cross-linking accelerators is preferably 0.1 to 10.0 parts by mass, more preferably 0.2 to 7.0 parts by mass, and still more preferably 0.3 to 5.0 parts by mass, relative to 100 parts by mass of solid content contained in each of the latexes. By adding a cross-linking accelerator in an amount of 0.1 parts by mass or higher, sufficient acceleration effects are obtained. By adding a cross-linking accelerator in an amount of 10.0 parts by mass or lower, a good cross-linking rate is achieved, cross-linking is easily managed due to suppressed scorching, and products having good mechanical properties such as tensile properties after cross-linking are obtained.

In cases where cross-linking by using a cross-linking accelerator alone is insufficient, a cross-linking agent is ordinarily used simultaneously. Preferred examples of cross-linking agents are sulfur-based cross-linking agents (such as powdery sulfur, surface-treated sulfur, precipitated sulfur, colloidal sulfur, and insoluble sulfur), and peroxide-based cross-linking agents (such as di-t-butylperoxide, cumene hydroperoxide, bis($\alpha,\alpha$-dimethylbenzyl)peroxide, benzoylperoxide, t-butylperbenzoate, 2,2-di-t-butylperoxybutane, and azobisisobutyronitrile), and sulfur is particularly preferred. The addition amount of a cross-linking agent is preferably 0.1 to 7.0 parts by mass, more preferably 0.2 to 5.0 parts by mass, and still more preferably 0.3 to 3.0 parts by mass, relative to 100 parts by mass of solid content contained in each of the latexes. By adding a cross-linking agent in an amount of 0.1 parts by mass or higher, sufficient acceleration effects are obtained, and by adding a cross-linking agent in an amount of 7.0 parts by mass or lower, a good cross-linking rate is obtained, cross-linking is easily managed due to suppressed scorching, products having good heat resistance after cross-linking are obtained, and bleeding barely occurs.

Antioxidant (F):

With respect to antioxidants, an antioxidant for imparting heat resistance (heat-resistant age resistor) and an ozone-resistant antioxidant (ozone-resistant age resistor) must be used in cases where ultimate heat resistance is required, and preferably, both are used simultaneously. Heat-resistant age resistors based on diphenylamines such as octylated diphenylamine, p-(p-toluene-sulfonylamide)diphenylamine, and 4,4'-bis($\alpha,\alpha$-dimethylbenzyl)diphenylamine are preferably used due to their stain resistance (suppressed spread of discoloration) in addition to their heat resistance. With respect to ozone-resistant age resistors, N,N'-diphenyl-p-phenylenediamine (DPPD) and N-isopropyl-N'-phenyl-p-phenylenediamine (IPPD) are preferably used. For products such as medical gloves in which appearance, particularly a color tone and a hygiene property are emphasized, however, hindered-phenolic antioxidants are normally used preferably. The addition amount of an antioxidant is preferably 0.1 to 10.0 parts by mass, more preferably 0.2 to 7.0 parts by mass, and still more preferably 0.3 to 5.0 parts by mass, relative to 100 parts by mass of solid content contained in each of the latexes. When the addition amount of an antioxidant is 0.1 parts by mass or higher, sufficient oxidation prevention effects are obtained, and when the addition amount is 10.0 parts by mass or lower, good cross-linking is achieved and a color tone does not change. Thus, the addition amount within the above range is preferred.

Preparation of Isoprene Polymer Latex Composition:

Before producing a molded product by a dip-molding method, a chloroprene polymer latex and an isoprene polymer latex are mixed to prepare an isoprene-based polymer latex composition.

According to the present invention, another polymer latex may be contained in addition to a chloroprene polymer latex and an isoprene polymer latex in an amount in which the object of the present invention is not lost. Examples of another polymer latex are acrylonitrile-butadiene rubber latex, acrylonitrile-butadiene-styrene latex, acrylate latex, methacrylate latex, styrene-butadiene rubber latex, chlorosulfonated polyethylene latex, and natural rubber latex.

The mixing ratio of the chloroprene polymer latex (A) to the isoprene polymer latex (B) in the isoprene-based polymer latex composition according to the present invention ((A):(B)) is 50:50 to 1:99, more preferably 30:70 to 1:99, and still more preferably 15:85 to 5:95 in terms of the mass ratio of solid content contained in the chloroprene polymer latex to solid content contained in the isoprene polymer latex. When the mixing ratio is within the above range, good breaking strength is achievable.

Film Forming Rate:

According to the present invention, the film forming rate of a polymer latex (a chloroprene polymer latex, an isoprene polymer latex, or an isoprene-based polymer latex composition) is evaluated such that a former on which a 30% by mass aqueous calcium nitrate solution as a coagulation liquid is adhered, is dipped in the latex for 60 seconds, thereafter the obtained rubber molded product is dried at a temperature of 70° C. for 30 minutes to give a dry rubber molded product, and from the film thickness of the obtained dry rubber molded product, the film forming rate is obtained based on the following formula.

Film forming rate(mm/min)=Film thickness of dry rubber molded product (mm)/dipping time (min)

The film forming rate of a chloroprene polymer latex is preferably 0.15 mm/min or higher and 0.50 mm/min or lower, more preferably 0.18 mm/min or higher and 0.44 mm/min or lower, and still more preferably 0.20 mm/min or higher and 0.30 mm/min or lower. When the film forming rate of the chloroprene polymer latex is 0.15 mm/min or higher, it slightly differs from the film forming rate of an isoprene polymer latex, causing no compositional change in the components constituting the mixture composition, and film formation is performable without changing in the compositional ratio. When the film forming rate is 0.50 mm/min or lower, the z-average particle size of a chloroprene polymer latex is within a good range, and good emulsification is achieved.

The film forming rate of a chloroprene polymer latex is preferably 41 or higher relative to the film forming rate of an isoprene polymer latex to be mixed, more preferably 42% or higher, and is still more preferably 43%; or higher.

EXAMPLES

The present invention is described by referring to examples and comparative examples below, but is not limited thereto.

Example 1

Preparation of Chloroprene Polymer Latex and Composition Thereof:

A reactor having an internal volume of 5 L was used, and 1.83 kg of 2-chloro-1,3-butadiene (chloroprene) (produced by Tokyo Chemical Industry, Co., Ltd.), 0.17 kg of 2,3-dichloro-1,3-butadiene (produced by Tokyo Chemical Industry, Co., Ltd.), 1.12 kg of pure water, 34 g of a rosin acid (R 300, produced by Arakawa Chemical Industries, Ltd.), 106.6 g of a 20% by mass aqueous potassium hydroxide solution (guaranteed reagent, produced by FUJIFILM Wako Pure Chemical Corporation), 24 g of a sodium salt of a 3-naphthalene sulfonate formaldehyde condensate (produced by Kao Corporation), and 6.0 g of sodium dodecyl benzene sulfonate (NEOPELEX® G-15, produced by Kao Corporation) were fed into the reactor and emulsified. After the rosin acid was converted into a rosin acid soap, polymerization was performed for 5 hours in a nitrogen gas atmosphere at an initial temperature of 40° C., using potassium persulfate ($1^{st}$ grade, produced by FUJIFILM Wako Pure Chemical Corporation) as an initiator. When the polymerization conversion was confirmed to be 88 or higher, the polymerization was terminated. Subsequently, unreacted monomers were eliminated via steam distillation to obtain a chloroprene polymer latex (A). The pH value was 13.7, the Mw in terms of polystyrene measured by GPC was 1,390,000, a chloroprene polymer contained in the chloroprene polymer latex (A) had a z-average particle size measured with a dynamic light scattering photometer of 190 nm, the tetrahydrofuran insoluble fraction was 94.1%, the solid content was 52.9%, and the Brookfield viscosity was 18 mPa·s.

To the chloroprene polymer latex (A) obtained above, a zinc oxide dispersion, cross-linking accelerators, and a phenolic antioxidant dispersion were added in the mixing ratios (parts by mass relative to 100 parts by mass of dry solids of the latex) shown in Table 1, and were mixed to prepare a chloroprene polymer latex composition. The chloroprene polymer latex composition exhibited a film forming rate of 0.21 mm/min.

The above polymerization conversion was obtained by the method below.

A latex after polymerization was collected and dried at a temperature of 141° C. for 30 minutes to obtain solid content, from which a polymerization conversion was calculated. The solid content and polymerization conversion were obtained by the following formulae.

Solid content after polymerization (% by mass)= [(mass after drying at 141° C. for 30 min.)/ (mass of latex before drying)]×100

Polymerization conversion (%)=[(amount of formed polymer/feed amount of chloroprene monomer)]×100

Here, the amount of formed polymer was obtained by subtracting the solid content other than the polymer from the solid content after polymerization. As the solid content other than the polymer, the amount of components not volatilizing under the conditions at 141° C. was calculated from the feed amount of polymerization raw materials.

A z-average particle size of polymer particles contained in a latex was obtained by measuring a solution obtained by diluting the latex with pure water to have a concentration of 0.01% to 0.1% by mass, with a dynamic light scattering photometer (ZETASIZER® Nano-S, produced by Malvern Panalytical Ltd.)

Preparation of Isoprene Polymer Latex Composition:

As the isoprene polymer latex (B), Cariflex® IR0401SU produced by Kraton Polymers Japan Limited was used. An isoprene polymer contained in the latex had a z-average particle size of 680 nm. To the isoprene polymer latex (B), a zinc oxide dispersion, cross-linking accelerators, a cross-linking agent (aqueous sulfur dispersion), and a phenolic antioxidant dispersion were added in the mixing ratios (parts by mass relative to 100 parts by mass of dry solids of the latex) shown in Table 2, and were mixed to prepare an isoprene polymer latex composition. The pH value was 11.3, and the Mw in terms of polystyrene measured by GPC was 3,180,000. The isoprene polymer latex (B) exhibited a film forming rate of 0.44 mm/min.

Preparation of Isoprene-Based Polymer Latex Composition (Mixture of Chloroprene Polymer Latex (A) and Isoprene Polymer Latex (B)):

Both the above polymer latexes were fed into a stirring vessel equipped with a Three-One Motor® in a ratio of the chloroprene polymer latex:the isoprene polymer latex=10: 90 (in terms of parts by mass of dry solids) and were stirred at a temperature of 23° C. at 300 rpm for 5 minutes to be homogeneously mixed. The composition after the stirring was left to age at a temperature of 20° C. for 24 hours. Before dipping a former, the thus-obtained isoprene-based polymer latex composition was fed into a stirring vessel equipped with a Three-One Motor® and was stirred at a temperature of 23° C. at 300 rpm for 5 minutes for use.

Comparative Example 1

Preparation of Chloroprene Polymer Latex and Composition Thereof for Comparison:

A reactor having an internal volume of 5 L was used, and 1.65 kg of 2-chloro-1,3-butadiene (chloroprene), 0.15 kg of 2,3-dichloro-1,3-butadiene, 1.45 kg of pure water, 77 g of a rosin acid (R-300, produced by Arakawa Chemical Industries, Ltd.), 102.6 g of a 20% by mass aqueous potassium hydroxide solution, 18.7 g of a 25% by mass aqueous sodium hydroxide solution, 9.5 g of a sodium salt of a β-naphthalene sulfonate formaldehyde condensate, and 1.08 g of n-dodecylmercaptan were fed into the reactor and emulsified, and after the rosin acid was converted into a rosin acid soap, polymerization was performed in a nitrogen gas atmosphere at an initial temperature of 40° C., using potassium persulfate as an initiator. When the polymerization conversion was confirmed to be 88% or higher, the polymerization was terminated. Subsequently, unreacted monomers were eliminated via steam distillation to obtain a chloroprene copolymer latex. A chloroprene polymer in the chloroprene polymer latex had a z-average particle size of 130 nm, the tetrahydrofuran insoluble fraction was 37.2%, the solid content was 50.5%, and the Brookfield viscosity was 16 mPa·s.

To the chloroprene polymer latex obtained above, a zinc oxide dispersion, cross-linking accelerators, and a phenolic antioxidant dispersion were added in the mixing ratios (parts by mass relative to 100 parts by mass of dry solids of the latex) shown in Table 1, and were mixed to prepare a chloroprene polymer latex composition.

Using the same isoprene polymer latex as the one described in Example 1, a mixed composition and a mixed molded product were prepared in the same manner as described in Example 1. The chloroprene polymer latex composition exhibited a film forming rate of 0.18 mm/min.

Preparation and Cross-Linking of Dip-Molded Film:

Dip-molded films were prepared from the isoprene-based polymer latex compositions prepared in Example 1 and Comparative Example 1 by the method below.

A ceramic plate having a length of 200 mm, a width of 100 mm, and a thickness of 5 mm was used as a former of a dip-molded film. The entire surface of the former was dipped in a 30% by mass aqueous calcium nitrate solution as a coagulation liquid. After being pulled up, the former was dried in an oven at a temperature of 40° C. for 5 minutes. The above operation was performed on 10 formers.

The 10 formers were dipped in 400 g of each of the isoprene-based polymer latex compositions and were pulled up in order, and 10 sheets of films in total were formed. (Each of the films are referred to as the $1^{st}$-prepared sample to the $10^{th}$-prepared sample.) The obtained films were dried in an oven at a temperature of 70° C. for 30 minutes. Subsequently, the films were cross-linked by heating in an oven at a temperature of 110° C. for 30 minutes. After left to cool at a temperature of 20° C., the films were cut out from the formers. Thereby cross-linked films were obtained.

Evaluation of Physical Properties after Cross-Linking:

The cross-linked sheets were each cut with a No. 6 dumbbell-shaped cutting blade specified in JIS-K6251-2017 to obtain test pieces. The thickness of each test piece was adjusted to 0.15 to 0.25 mm.

Tensile Test

A tensile test after cross-linking and heat aging (at 110° C. for 16 hours) was performed by a method in accordance with JIS-K6251-2017. During the test, a modulus at 100 elongation (M100), a modulus at 300% elongation (M300), a modulus at 500%, elongation (M500), a tensile strength ($T_B$), and an elongation ($E_B$) at room temperature were measured. In addition, the retention of tensile strength ($T_B$) was obtained based on the following formula.

$T_B$ retention (%)=($T_B$ of the $X^{th}$ prepared sample)/($T_B$ of the $1^{st}$ prepared sample)×100

Viscosity:

A test sample was poured into a 300 mL polypropylene beaker and bubbles included therein were completely eliminated. Using a B-type viscometer specified in JIS K7117-1:1999, viscosity was measured. Among the results obtained by continuous measurement, in which the measured value was within 5%, the viscosity of the second result was recorded.

Instrument: Viscometer, DV-E LVDVE115, produced by BROOKFIELD
Spindle: No. 1 spindle
Velocity: 60 rpm
Temperature: 20° C.

Tetrahydrofuran Insoluble Fraction:

Each of the isoprene polymer latexes in an amount of 1 g (water content: 35 to 65% by mass) was added dropwise to 100 mL of tetrahydrofuran, and was shaken with a shaker (SA300) produced by Yamato Scientific Co., Ltd., for 10 hours. The obtained mixture was thereafter subjected to centrifugal separation with a centrifuge (H-9R, produced by Kokusan Co., Ltd.) at 14,000 rpm for 60 minutes, and a supernatant dissolved phase was separated. Tetrahydrofuran was evaporated at a temperature of 100° C. for 1 hour to obtain a dry solid matter, and the dissolved amount was calculated and subtracted to obtain a tetrahydrofuran insoluble fraction (% by mass).

Molecular Weight:

The supernatant dissolved phase after the centrifugal separation at the time of measuring a gel content described above was separated, diluted with tetrahydrofuran, and subjected to molecular weight measurement in terms of polystyrene, by GPC (gel permeation chromatography). Thereby a weight average molecular weight (Mw) was measured. The GPC measurement conditions were determined such that LC-20AD produced by Shimadzu Corporation was used as a GPC measurement device, RID-10A (refractive index detector) produced by Shimadzu Corporation was used as a detector, the column type was PLgel 10 μm MiniMIX-B produced by Agilent Technologies Japan, Ltd., and tetrahydrofuran (for HPLC, produced by Kanto Chemical Co., Inc.) was used as an eluting solution, at a column temperature of 40° C., and an outflow rate of 0.4 mL/min.

pH Values:

Using a benchtop pH meter F-71 (produced by Horiba, Ltd.), pH values were measured at a sample temperature of 25° C.

Results are summarized in Tables 3 and 4.

TABLE 1

| Components to be mixed | Mixing ratio (parts by mass) |
|---|---|
| Chloroprene polymer latex | 100 |
| Zinc oxide dispersion[1] | 5 |
| Cross-linking accelerator ZDBC[2] | 0.5 |
| Cross-linking accelerator ZMBT[3] | 0.5 |
| Cross-linking accelerator DPG[4] | 0.25 |
| Phenolic antioxidant dispersion[5] | 2 |

[1]AZ-SW, produced by Osaki Industry Co., Ltd.
[2]Nocceler® BZ, produced by Ouchi Shinko Chemical Industrial Co., Ltd.
[3]Nocceler® MZ, produced by Ouchi Shinko Chemical Industrial CO., Ltd.
[4]Nocceler® D, produced by Ouchi Shinko Chemical Industrial Co., Ltd.
[5]K-840, produced by Chukyo Yushi Co., Ltd.

TABLE 2

| Components to be mixed | Mixing ratio (parts by mass) |
|---|---|
| Isoprene polymer latex | 100 |
| Zinc oxide dispersion[1] | 0.5 |
| Sulfur[6] | 1.5 |

TABLE 2-continued

| Components to be mixed | Mixing ratio (parts by mass) |
|---|---|
| Cross-linking accelerator[2] | 0.5 |
| Cross-linking accelerator[3] | 0.5 |
| Cross-linking accelerator[4] | 0.25 |
| Phenolic antioxidant dispersion[5] | 2 |

[1] to [5] are the same as described in Table 1.
[6] S-50, produced by Nippon Color Ind., Co., Ltd.

TABLE 3

|  |  | Example 1 | Comparative Example 1 |
|---|---|---|---|
| Isoprene-based polymer latex | Film forming rate (mm/min) | 0.21 | 0.18 |
|  | Z-average particle size (nm) | 190 | 130 |
|  | Tetrahydrofuran insoluble fraction (%) | 94.1 | 37.2 |
|  | Solid content (%) | 52.9 | 50.5 |
|  | BF viscosity (mPa · s) | 18 | 16 |

TABLE 4

|  | Example 1 | | | | Comparative Example 1 | | | |
|---|---|---|---|---|---|---|---|---|
| Number of times of dipping | $1^{st}$ time | $3^{rd}$ time | $7^{th}$ time | $10^{th}$ time | $1^{st}$ time | $3^{rd}$ time | $7^{th}$ time | $10^{th}$ time |
| Mixing ratio of chloroprene polymer latex:isoprene polymer latex (mass ratio) | 10:90 | 10:90 | 10:90 | 10:90 | 10:90 | 10:90 | 10:90 | 10:90 |
| Cross-linking temperature (° C.) | 110 | 110 | 110 | 110 | 110 | 110 | 110 | 110 |
| Cross-linking time (min) | 30 | 30 | 30 | 30 | 30 | 30 | 30 | 30 |
| M100 (MPa) | 0.64 | 0.64 | 0.64 | 0.61 | 0.62 | 0.62 | 0.61 | 0.58 |
| M300 (MPa) | 1.10 | 1.13 | 1.20 | 1.10 | 1.20 | 1.10 | 1.20 | 1.10 |
| M500 (MPa) | 1.80 | 1.80 | 1.90 | 1.90 | 1.80 | 1.80 | 1.90 | 1.80 |
| Eb (%) | 1050 | 1050 | 1050 | 1050 | 1050 | 1050 | 1050 | 1050 |
| Tb (MPa) | 27.3 | 27.8 | 27.3 | 27.8 | 26.5 | 25.9 | 25.6 | 22.8 |
| Tb retention relative to the Tb of the $1^{st}$ prepared sample (%) | 100 | 102 | 100 | 102 | 100 | 98 | 97 | 86 |

Table 4 shows that in Comparative Example 1 in which the z-average particle size of the chloroprene polymer is smaller, the more times dipping is performed, the lower the retention of Tb relative to the Tb of the $1^{st}$-prepared sample is. Further shown is that dip-molded products retaining constant properties are not obtainable due to the compositional change in the chloroprene-based polymer composition.

The invention claimed is:

1. An isoprene-based polymer latex composition comprising a chloroprene polymer latex (A), an isoprene polymer latex (B), and an emulsifier (C), wherein the chloroprene polymer latex has a z-average particle size of chloroprene polymer particles contained therein of 180 nm or greater and smaller than 300 nm and a tetrahydrofuran insoluble fraction of 88 to 99% by mass based on the amount of solid content of the chloroprene polymer latex (A), the chloroprene polymer latex (A) is (1) a copolymer latex of chloroprene (A-1) and 2,3-dichloro-1,3-butadiene (A-2-1), or (2) a copolymer latex of chloroprene (A-1), 2,3-dichloro-1,3-butadiene (A-2-1), and another monomer (A-2-2), and the copolymer is obtained by copolymerization in which the ratio of 2,3-dichloro-1,3-butadiene (A-2-1) is 5.0 to 30.0% by mass relative to the total amount of the monomer components chloroprene (A-1) and 2,3-dichloro-1,3-butadiene (A-2-1) of 100% by mass.

2. The isoprene-based polymer latex composition according to claim 1, comprising at least one of a metal oxide (D), a cross-linking accelerator (E), and an antioxidant (F).

3. The isoprene-based polymer latex composition according to claim 2, comprising, relative to 100 parts by mass of solid content contained in the isoprene-based polymer latex composition, the emulsifier (C) in a ratio of 1.0 to 30.0 parts by mass, the metal oxide (D) in a ratio of 0.1 to 20.0 parts by mass, the cross-linking accelerator (E) in a ratio of 0.1 to 10.0 parts by mass, and the antioxidant (F) in a ratio of 0.1 to 10.0 parts by mass.

4. The isoprene-based polymer latex composition according to claim 2, wherein the mass ratio of the solid content contained in the chloroprene polymer latex (A) to the solid content contained in the isoprene polymer latex (B) is 50:50 to 1:99.

5. The isoprene-based polymer latex composition according to claim 2, wherein the film forming rate of the chloroprene polymer latex is 0.15 mm/min or higher and 0.50 mm/min or lower.

6. The isoprene-based polymer latex composition according to claim 2, wherein the film forming rate of the chloroprene polymer latex is 41% or higher relative to the film forming rate of the isoprene polymer latex to be mixed.

7. The isoprene-based polymer latex composition according to claim 2, wherein the chloroprene polymer latex has a pH value of 10.5 or higher and 14.0 or lower.

8. The isoprene-based polymer latex composition according to claim 2, wherein the isoprene polymer particles in the isoprene polymer latex have a z-average particle size of 300 nm or greater and 1,000 nm or smaller.

9. A dip-molded product obtained by curing the isoprene-based polymer latex composition according to claim 2 by a dip-molding method.

10. The isoprene-based polymer latex composition according to claim 1, wherein the emulsifier (C) is an anionic surfactant.

11. The isoprene-based polymer latex composition according to claim 1, wherein the emulsifier (C) contains a rosin acid soap obtained by saponifying a rosin acid with sodium hydroxide and/or potassium hydroxide in an excess amount relative to the rosin acid.

12. The isoprene-based polymer latex composition according to claim 1, wherein the mass ratio of the solid content contained in the chloroprene polymer latex (A) to the solid content contained in the isoprene polymer latex (B) is 50:50 to 1:99.

13. The isoprene-based polymer latex composition according to claim 1, wherein the film forming rate of the chloroprene polymer latex is 0.15 mm/min or higher and 0.50 mm/min or lower.

14. The isoprene-based polymer latex composition according to claim 1, wherein the film forming rate of the chloroprene polymer latex is 41% or higher relative to the film forming rate of the isoprene polymer latex to be mixed.

15. The isoprene-based polymer latex composition according to claim 1, wherein the chloroprene polymer latex has a pH value of 10.5 or higher and 14.0 or lower.

16. The isoprene-based polymer latex composition according to claim 1, wherein the isoprene polymer particles in the isoprene polymer latex have a z-average particle size of 300 nm or greater and 1,000 nm or smaller.

17. A dip-molded product obtained by curing the isoprene-based polymer latex composition according to claim 1 by a dip-molding method.

18. The dip-molded product according to claim 17, which is a disposable rubber glove.

* * * * *